US010354309B2

United States Patent
El-Charif et al.

(10) Patent No.: US 10,354,309 B2
(45) Date of Patent: *Jul. 16, 2019

(54) METHODS AND SYSTEMS FOR SELECTING AN OPTIMIZED SCORING FUNCTION FOR USE IN RANKING ITEM LISTINGS PRESENTED IN SEARCH RESULTS

(71) Applicant: eBay Inc., San Jose, CA (US)

(72) Inventors: Rami El-Charif, San Jose, CA (US); Sanjay Pundlkrao Ghatare, San Jose, CA (US); Steven Chen, San Jose, CA (US); Olivier G. Dumon, San Francisco, CA (US); Muhammad Faisal Rehman, San Jose, CA (US); Guanglei Song, San Jose, CA (US)

(73) Assignee: eBay Inc., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/049,677

(22) Filed: Feb. 22, 2016

(65) Prior Publication Data

US 2016/0171587 A1   Jun. 16, 2016

Related U.S. Application Data

(63) Continuation of application No. 12/694,185, filed on Jan. 26, 2010, now Pat. No. 9,268,850.

(51) Int. Cl.
*G06F 17/30* (2006.01)
*G06Q 30/06* (2012.01)
(Continued)

(52) U.S. Cl.
CPC ....... *G06Q 30/0629* (2013.01); *G06F 16/248* (2019.01); *G06F 16/24578* (2019.01);
(Continued)

(58) Field of Classification Search
CPC ......... G06F 17/30657; G06F 17/30864; G06F 16/24578; G06F 16/248; G06F 16/3331;
(Continued)

(56) References Cited

U.S. PATENT DOCUMENTS 8,060,497 B1 * 11/2011 Zatsman ........... G06F 17/30864
707/723
9,268,850 B2   2/2016 El-Charif
(Continued)

OTHER PUBLICATIONS

"U.S. Appl. No. 12/694,185 , Response filed Jul. 1, 2013 to Final Office Action dated Mar. 29, 2013", 11 pgs.
(Continued)

*Primary Examiner* — Shew Fen Lin
(74) *Attorney, Agent, or Firm* — Shook, Hardy & Bacon L.L.P.

(57) ABSTRACT

Methods and systems for simulating a search, for the purpose of evaluating one or more scoring functions used in ordering item listings for presentation in a search results page are described. Consistent with some embodiments, a simulation platform includes a real-time simulation module that receives search result sets for search queries that result in the conclusion of a transaction. The result set is then processed by the simulation platform with one or more test scoring functions, such that the resulting position of the item listing that has resulted in the transaction can be compared with the actual position at which the item listing was displayed in the actual search results. For each test scoring function, an average rank shift metric is determined, and displayed, thereby providing a metric with which to base decisions about which scoring functions to use in the production system.

20 Claims, 9 Drawing Sheets

(51) Int. Cl.
*G06F 16/248* (2019.01)
*G06F 16/951* (2019.01)
*G06F 16/33* (2019.01)
*G06F 16/9535* (2019.01)
*G06F 16/2457* (2019.01)

(52) U.S. Cl.
CPC ........ *G06F 16/3331* (2019.01); *G06F 16/951* (2019.01); *G06F 16/9535* (2019.01)

(58) Field of Classification Search
CPC .............. G06F 16/951; G06F 16/9535; G06Q 30/0629
See application file for complete search history.

(56) References Cited

U.S. PATENT DOCUMENTS

| | | | |
|---|---|---|---|
| 2006/0004713 A1 | 1/2006 | Korte et al. | |
| 2006/0064411 A1* | 3/2006 | Gross | G06F 17/30864 |
| 2006/0123014 A1 | 6/2006 | Ng | |
| 2006/0224577 A1* | 10/2006 | Hullender | G06F 17/30864 |
| 2007/0192293 A1 | 8/2007 | Swen | |
| 2008/0082400 A1 | 4/2008 | Martel et al. | |
| 2008/0243838 A1 | 10/2008 | Scott et al. | |
| 2008/0281810 A1 | 11/2008 | Smyth et al. | |
| 2009/0204599 A1 | 8/2009 | Morris et al. | |
| 2009/0222437 A1 | 9/2009 | Niu et al. | |
| 2009/0265290 A1* | 10/2009 | Ciaramita | G06N 3/08 706/12 |
| 2010/0005089 A1 | 1/2010 | Yacobi et al. | |
| 2010/0057726 A1 | 3/2010 | Ma et al. | |
| 2010/0110180 A1 | 5/2010 | Tonogai et al. | |
| 2010/0306215 A1 | 12/2010 | Azar et al. | |
| 2011/0004608 A1* | 1/2011 | Solaro | G06F 17/30864 707/759 |
| 2011/0099830 A1 | 5/2011 | Conrad | |
| 2011/0184941 A1 | 7/2011 | El-charif et al. | |

OTHER PUBLICATIONS

"U.S. Appl. No. 12/694,185, Examiner Interview Summary dated Jul. 13, 2015", 3 pgs.

"U.S. Appl. No. 12/694,185, Final Office Action dated Mar. 29, 2013", 13 pgs.

"U.S. Appl. No. 12/694,185, Non Final Office Action dated Apr. 16, 2015", 14 pgs.

"U.S. Appl. No. 12/694,185, Non Final Office Action dated Dec. 20, 2011", 10 pgs.

"U.S. Appl. No. 12/694,185, Notice of Allowance dated Oct. 16, 2015", 12 pgs.

"U.S. Appl. No. 12/694,185, Response filed Jun. 11, 2012 to Non Final Office Action dated Dec. 20, 2011", 11 pgs.

"U.S. Appl. No. 13/694,185, Response filed Jul. 16, 2015 to Non Final Office action dated Apr. 16, 2015", 35 pgs.

* cited by examiner

| | PRODUCTION SCORING FUNCTION (BASELINE) | TEST SCORING FUNCTION 1 | TEST SCORING FUNCTION 2 | ... | TEST SCORING FUNCTION N |
|---|---|---|---|---|---|
| QUERY 1 | • | 2↑ | 4↓ | | 0 |
| QUERY 2 | • | 0 | 3↓ | | 3↓ |
| QUERY 3 | • | 2↑ | 1↓ | | 1↓ |
| QUERY 4 | • | 0 | 1↓ | | 1↓ |
| ... | • | • | • | | • |
| QUERY N | • | • | • | | • |
| AVERAGE RANK SHIFT | | 1.2↑ | 2.3↓ | | 1.1↓ |

FIGURE 6

METHODS AND SYSTEMS FOR SELECTING AN OPTIMIZED SCORING FUNCTION FOR USE IN RANKING ITEM LISTINGS PRESENTED IN SEARCH RESULTS

TECHNICAL FIELD

The present disclosure generally relates to data processing techniques. More specifically, the present disclosure relates to methods and systems for simulating how search results are processed for the purpose of selecting an optimized scoring function for use in ordering the search results when presenting the search results to an end-user of a computer-based trading or e-commerce application.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, providing a marketplace to connect sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

In order to maximize the number of transactions that are concluded, application developers make significant efforts to determine the characteristics (or attributes) of item listings that are the best indicators of the likelihood that an item listing will result in the conclusion of a transaction. Item listings with the desired item characteristics are then presented in the most prominent positions of the search results page (or pages) to maximize the likelihood that those item listings will be selected, and ultimately a transaction will be concluded. Accordingly, search engines used in conjunction with e-commerce applications may use some sort of parametric scoring function to assign a score to each item listing that satisfies a particular query. For example, the desired item characteristics are formulated as parameters in the scoring function such that, those item listings having the most desirable item characteristics will be assigned the highest score based on the scoring function, and therefore will be presented most prominently in the search results page or pages.

DESCRIPTION OF THE DRAWINGS

Some embodiments are illustrated by way of example and not limitation in the figures of the accompanying drawings, in which:

FIG. 6 is a table showing how an average rank shift metric is derived for a predetermined number of search queries, for one or more test functions, according to an embodiment of the invention;

DETAILED DESCRIPTION

Figure 1:
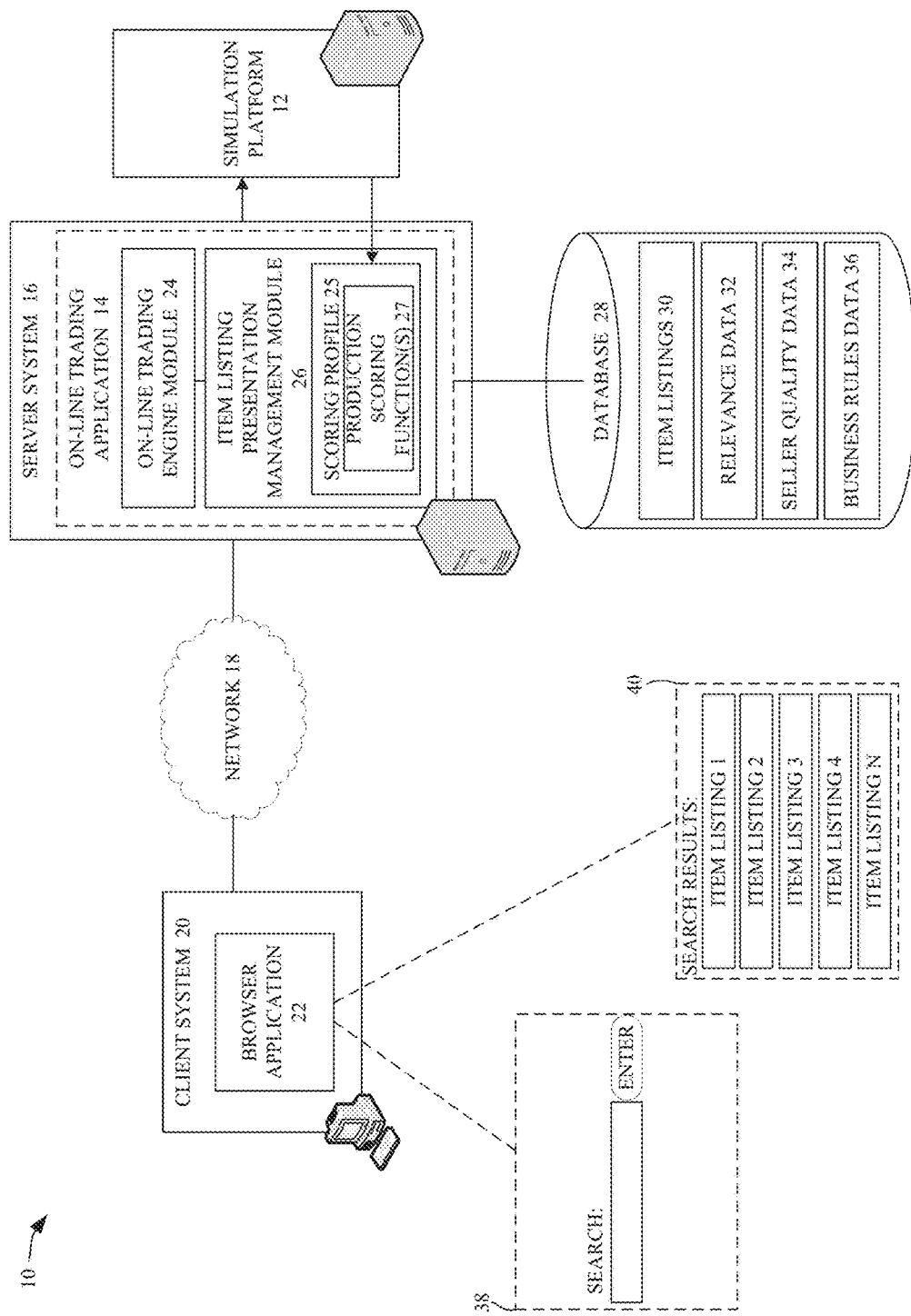
FIG. 1 is a block diagram of a computer-based network environment including a simulation platform for use with a computer-based on-line trading application, according to an embodiment of the invention.

Methods and systems for simulating how search results are processed for the purpose of generating and selecting an optimized scoring function for use in ordering the search results when presenting the search results to an end-user of a computer-based trading or e-commerce application are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Consistent with some embodiments of the invention, an on-line trading or e-commerce application utilizes a parametric scoring function to assign a score to each item listing that satisfies an end-user's search query. The score, which may be referred to as a listing performance score or best match score, is used to rank and order all of the item listings that satisfy a given search query so that the item listings with the best (e.g., highest, or in some instances, lowest) score can be presented in the most prominent positions of the search results page or pages. Typically this means that the item listings with the highest score are presented at the top of a list of item listings presented in the search results page or pages. However, in various alternative embodiments, different scoring algorithms may be used such that the item listings that are to be displayed in the most prominent positions of the search results page or pages will be those item listings assigned the lowest scores. Additionally, in some embodiments, item listings may be presented in some manner other than a top-down list.

The scoring functions used in ranking and ordering search results are referred to as parametric scoring functions because the scoring functions are expressed with weighted parameters that are selected to reflect a measure of various characteristics (sometimes referred to as item attributes) of an item listing. The parameters are chosen to reflect item characteristics, and in some cases seller characteristics, that generally correlate with whether or not an item listing is likely to be selected when presented in the search results, and ultimately whether the item listing, if displayed to an end-user in a search results page, is likely to result in the conclusion of a transaction (e.g., a conversion or sale). For instance, one parameter used in a scoring function may represent a measure of an item listing's relevance with respect to the exact search terms provided in the end-user's search query. Accordingly, if the item listing is determined to be particularly relevant in light of the search terms provided by the end-user, the parameter that represents the measure of relevance will have a positive impact on the overall listing performance score of the item listing. Consequently, all else equal, an item listing with a high relevance score is likely to be positioned more prominently in the search results than an item listing with a low relevance score. Because the scoring functions are used in arranging the item listings in the search results page or pages, it is important that the scoring functions include the proper parameters, and that the parameters are properly weighted, for example, to emphasize the item characteristics having the greatest impact on the overall desirability of an item listing.

Other parameters may be chosen as being representative of an item listing's overall quality, for example, based on such item attributes as the price of an item, the shipping cost of an item, the stated condition of an item, and/or the length of time that an item listing has been active. In yet another example, one or more parameters may represent a measure of demand for an item listing. The demand may be measured as the number of search impressions that a particular item listing has received (e.g., the number of times an item listing has appeared in the search results of a search request), the number of times that an end-user has selected an item listing after the item listing was presented in a search results page, and/or the number of times that an item listing, or a similar listing, has resulted in the conclusion of a transaction (e.g., the sale of an item or service offered via the item listing). Those skilled in the art will readily appreciate that the exact type and nature of parameters that might be used in a parametric scoring function for ranking and ordering search results is virtually unlimited. Some specific example parameters for use with a scoring function for ranking and ordering search results containing item listings for an on-line trading or e-commerce application are described in connection with the description of FIG. 2 below.

In some embodiments of the invention, the parameters of the scoring functions are weighted, for example, by multiplying each parameter by a weighting factor to give greater emphasis to certain parameters in deriving the overall listing performance score assigned to each item listing. Additionally, in some embodiments, different scoring functions are used for different listing types, or listing formats. For instance, in some embodiments, different scoring functions may be used to process item listings having a fixed-price and item listings offering items at auction with no fixed price. In addition, in some embodiments, item listings may be grouped based on categories, such that all item listings associated with a certain group of categories are assigned to a particular group (sometimes referred to as a vertical to reflect a particular market segment). For instance, one group may be established for clothing, shoes and accessories. Accordingly, any item listing that is assigned to a category for clothes, a category for shoes, or a category for accessories, will automatically be part of the clothes, shoes and accessories group. The scoring function used in the processing of item listings in the clothes, shoes and accessories group may be different from the scoring function used to assign a listing performance score for item listings in other categories or groups, such as a category or group for jewelry, or automobiles, and so forth.

In some embodiments, a scoring profile defines a set of scoring functions and maps the scoring functions to the listing types, groups or categories of item listings with which the scoring functions are to be used. For example, a scoring profile may define a first scoring function for a clothes, shoes and accessories group, a second scoring function for an automobiles group, and a third scoring function for a jewelry group. In various embodiments, the mapping of scoring functions to listing types, categories or groups, may be defined at a more granular level. For example, in some embodiments, scoring functions may be individually defined and mapped to item listings in certain sub-categories, and so on.

Consistent with some embodiments of the invention, when the item listings are presented in the search results pages, an activity monitor detects certain end-user activities and generates event data indicating what type of activity was detected and to which item listing the activity was directed or with which item listing the activity was associated. For example, the activity monitor may detect when an end-user selects (e.g., with a cursor control device, such as a mouse or touch screen) a particular item listing presented in the search results page or pages. Such an event is often referred to as a "view item page" event. Similarly, the activity monitor may detect and keep track of those item listings that, after being displayed in a search results page as a result of processing a particular search query, result in the conclusion of a transaction. For instance, after an end-user has selected an item listing to view, the end-user may bid on an item offered via auction, or select a fixed-priced item that is offered via a buy-it-now feature. An event that results in the sale of an item is generally referred to as a conversion event. An item listing that results in the conversion of an item— that is, the sale of an item or service offered via the item listing—is referred to herein as a converting item listing.

When a conversion event occurs, the activity monitor detects and stores the particular position of the item listing that ultimately resulted in the conclusion of a transaction. For example, the position of the item listing may be the listing slot number identifying the listing slot at which the item listing was displayed in the search results page. If, for example, the item listing was the very first item listing in the search results page, the listing slot number for the item listing would be one. In some embodiments, listing slots may be assigned by page and number, such that each item listing is assigned to a particular page of search results, and a particular listing slot (e.g., position or order in a list) on the assigned page. For instance, in such a scenario, the item listing assigned the highest listing performance score by the production scoring function would be assigned listing slot one, on search results page number one. In any case, when a conversion event occurs, the position of the item listing that resulted in the conversion is detected, and passed to the real-time simulation platform with the search result set (e.g., the item listings that satisfied the end-user's query).

When the simulation platform receives the search result set, a data tracking module first identifies and retrieves all relevant data associated with the item listings included in the search result set. In some embodiments, the relevant data is the data required as input to the one or more test scoring functions being evaluated by the simulation platform. In any case, once the data is identified and retrieved, the item listings (and associated item attribute data) are processed with one or more test scoring functions. As a result, each item listing in the set of search results is assigned a position at which the item listing would appear if the item listing was to be presented in a search results page. The position (e.g., listing slot) assigned by the test scoring function of the particular item listing that resulted in the conclusion of a transaction can then be compared to the original position that was assigned to the converting item listing by the production scoring function. If, for example, the test scoring function assigns a lower listing slot number—indicating that the item listing would appear closer to the top of the list of search results, then the test scoring function has outperformed the production scoring function for that one particular query. By simulating the processing of search results for a sufficiently large number of queries, the performance of one or more test scoring functions can be compared with the performance of the production scoring function. If the results indicate that one of the test scoring functions consistently outperforms the production scoring function, for example, by positioning the converting item listing in a lower listing slot number, then a decision may be made to move the test scoring function to the production system.

In yet another aspect of the invention, an offline simulator receives sets of search results and the corresponding converting item listings for those search results, and generates weighted parameters for new scoring functions based on some pre-defined constraints. For instance, the sets of search results are processed by the offline simulator module to derive new weighting factors for a given set of parameters used in a scoring function. The parameters may be the same parameters as those in use by a production scoring function, or the parameters may be different from those in use by the production scoring function. The set of constraints, for example, might be defined to derive the weighting factors that result in the largest positive average rank shift for a set of search results. For instance, the weighting factors may be selected such that, on average, the converting item listing appears in the highest position on the list (corresponding with the lowest listing slot number). Of course, other constraints might be specified to achieve other business objectives. Various other inventive aspects of the methods and systems described herein will become readily apparent from the description of the figures that follows.

FIG. 1 is a block diagram of a computer-based network environment 10 including a simulation platform 12 for use with a computer-based on-line trading application 14, according to an embodiment of the invention. As illustrated in FIG. 1, the on-line trading application 14 is shown to reside on a server system 16 that is coupled by means of a network 18 to a client computer system 20. Accordingly, in some embodiments, the on-line trading application is a web-based application that is accessible via a conventional web browser application 22, for example, residing and executing at client computer system 20. Although shown in FIG. 1 as residing on a single server system 16, in various embodiments the on-line trading application 14 may be implemented in a cluster configuration such that the trading application is distributed across a number of server systems. As shown in FIG. 1, the on-line trading application 14 is coupled to a simulation platform 12 residing and executing on a separate server system. In some embodiments, the simulation platform 12 will reside and execute at one or more separate processor-based computer systems, as shown in FIG. 1. However, in some alternative embodiments, one or more of the various modules comprising the simulation platform 12 may reside and execute on the same server system 16 as the on-line trading application 14.

In this example, the online trading application 14 comprises two primary modules—an on-line trading engine module 24, and an item listing presentation management module 26. In some embodiments, the on-line trading engine module 24 may consist of a variety of sub-components or modules, which provide some of the many functions included as part of the on-line trading application 14. As described more completely below, each module may comprise software instructions, computer hardware components, or a combination of both. To avoid obscuring the invention in unnecessary detail, only a few of the on-line trading engine functions (germane to the invention) are described herein. For example, the on-line trading engine module 24 may include an item listing management module (not shown in FIG. 1) that facilitates the receiving and storing of data representing item attributes, which collectively form an item listing. When a user desires to list a single item, or multiple items, for sale, the user will provide information about the item(s) (e.g., item attributes). Such information may be submitted via one or more forms of one or more web pages, or via drop down lists, or similar user interface elements. The item listing management module receives the item attributes and stores the item attributes together within a database 28 as an item listing. In some instances, the item listings may be stored in an item listing database table 30. As described in greater detail below, the item attributes of each item listing are analyzed to determine a ranking score assigned to item listings and used in determining the position of item listings (e.g., the order of item listings) when the item listings are being presented in a search results page. In addition, the item attributes of each item listing may be utilized by the simulation platform 12 to evaluate the performance of one or more alternative scoring functions, or test scoring functions.

The on-line trading engine module 24 may also include one or more modules for detecting, receiving and storing activity data that is used as an input to a scoring function to measure the likelihood that an item listing will, if presented in a search results page, result in a transaction being concluded. For instance, in some embodiments, data associated with user-initiated activities are analyzed and captured for the purpose of predicting future user activities. If a user submits a search request including certain search terms, and then proceeds to conclude a transaction for a particular item (e.g., purchase the item), information from the user's interaction with the online trading application 14 will be captured and stored for the purpose of predicting future actions by other users. Some of the data used in this capacity is generally referred to as relevance data 32 because it is used to determine a measure of relevance between search terms used in a search query, and individual item listings. For instance, if a potential buyer submits a search request with the search terms, "mobile phone", item listings that have certain item attributes are more likely to result in the conclusion of a transaction if presented in a search results page in response to the search request. For instance, continuing with the example search terms, "mobile phone", given the specific search terms used in the search query, item listings that have been designated as being in a certain category of items, such as "Electronics", or even more specifically, "Mobile Phones", are more likely to result in a transaction if presented in a search results page than item listings in other categories, for example, such as "Automobiles" or "Jewelry". Similarly, given the search terms, "mobile phone", item listings with titles that include the search terms may prove more likely to result in a transaction than item listings without the search terms in the title. Accordingly, in some embodiments, the on-line trading engine module 24 includes one or more modules for receiving and analyzing historical activity data to generate what is referred to herein as relevance data 32. The relevance data 32 may be used as a parameter in a scoring function, or as an input to a parameter, to derive a measure of the likelihood that item listings with certain item attributes will result in a transaction if displayed in response to certain search terms being submitted in a search request.

The on-line trading engine module 24 may also include one or more modules for receiving and storing data representing, among other things, a measure of a seller's performance of obligations associated with transactions in which the seller has previously participated. For instance, in some embodiments, when a transaction is concluded, a buyer may be prompted to provide feedback information concerning the performance of a seller. The buyer may, for example, rate the accuracy of the seller's description of an item provided in the item listing. For instance, if the item received by the buyer is in poor condition, but was described in the item listing as being in good condition, the buyer may provide feedback information to reflect that the seller's description of the item in the item listing was inaccurate. This information may be used as a parameter to a scoring function used to assign an item listing performance score to item listings when processing a search query. For instance, in some cases, the seller feedback information may be used to determine a listing performance score for another item listing of the same seller. Such information may be stored in a database 28, as indicated in FIG. 1 by the seller quality data with reference number 34.

As illustrated in FIG. 1, the database is also shown to include business rules data 36. In some embodiments, the business rules data 36 is managed and used by a business rules management module (not shown) for the purpose of promoting and/or demoting item listings that satisfy a search query. For instance, when determining the order or arrangement of item listings for presentation on a search results page, an item listing may be promoted—presented in a more prominent position—or, demoted—presented in a less prominent position—based on the evaluation of a business rule that is dependent upon certain business rule data 36. In some embodiments, item attributes and seller attributes may be used in conjunction with the business rules data, for the purpose of evaluating business rules. In some embodiments, the promotion or demotion may be effected by utilizing a business rules score as a parameter in a scoring function, such that the business rules score is multiplied by one or more other parameters of the scoring function. Business rules may be used to promote certain business policies and to impact user's behavior. For instance, a business rule that provides a promotion to item listings that are offering free shipping will likely have the effect of persuading sellers to offer free shipping to have their item listings appear in the most prominent positions of the search results page. Similarly, demoting item listings based on negative seller feedback information will typically motivate sellers to perform their obligations as agreed upon.

Referring again to FIG. 1, the second primary module of the on-line trading application 14 is an item listing presentation management module 26. The item listing presentation management module 26 includes logic used to process search queries and assign a listing performance score (sometimes referred to as a best match score) to item listings that satisfy a search query, and to use the listing performance score assigned to each item listing that satisfies the search query to determine the order of item listings when the item listings are presented in a search results page. Accordingly, the item listing presentation management module 26 includes a scoring profile that defines one or more production scoring functions used to process the set of item listings that satisfy a search query. The item listing presentation management module 26 utilizes the production scoring function(s) to analyze the various attributes of the item listings and assign each item listing a listing performance score that ultimately determines the listing's position in the search results page or pages.

For instance, in some embodiments, a user operates a web browser application 22 on a client system 20 to interact with the on-line trading application 24 residing and executing on the server system 16. As illustrated by the example user interface with reference number 38, a user may be presented with a search interface 38, with which the user can specify one or more search terms to be used in a search request submitted to the on-line trading application 14. In some embodiments, in addition to specifying search terms, users may be able to select certain item attributes, such as the desired color of an item, the item categories that are to be searched, and so on. After receiving and processing the search request, the on-line trading application 14 communicates a response to the web browser application 22 on the client system 20. For instance, the response is an Internet document or web page that, when rendered by the browser application 22, displays a search results page 40 showing several item listings that satisfy the user's search request. As illustrated in the example search results page 40 of FIG. 1, the item listings are arranged or positioned on the search results page in an order determined by the item listing presentation management module 26. In particular, the order of the item listings as presented on the search results page 40 is determined based on the production scoring functions 27 specified as part of the scoring profile 25. The item listings are, in some embodiments, presented by a presentation module, which may be, or operate in conjunction with, a web server or an application server.

In general, the item listings are presented in the search results page in an order based on a listing performance score (e.g., a ranking score) that is assigned to each item listing that satisfies the query—also referred to as the result set of a search query, or, search results set. In some embodiments, the item listings will be arranged in a simple list, with the item listing having the highest listing performance score (e.g., ranking score) appearing in the first listing slot, for example, at the top of the list, followed by the item listing with the next highest listing performance score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their listing performance scores. For instance, instead of using a simple list, in some embodiments the item listings may be presented one item listing per page, or, arranged in some manner other than a top-down list.

The listing performance score assigned to each item listing may be based on several component scores (e.g., parameters) including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and, a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. Moreover, it will be appreciated that the parameters specified for any given scoring function may be defined at various levels of granularity, such that a parameter may represent a component score, or a sub-component, and so on. For instance, in some embodiments, the ranking score may be equivalent to a single component score, such as the listing quality score. Alternatively, various components that comprise the listing quality score may be parameters with their own weighting factors.

Figure 2:
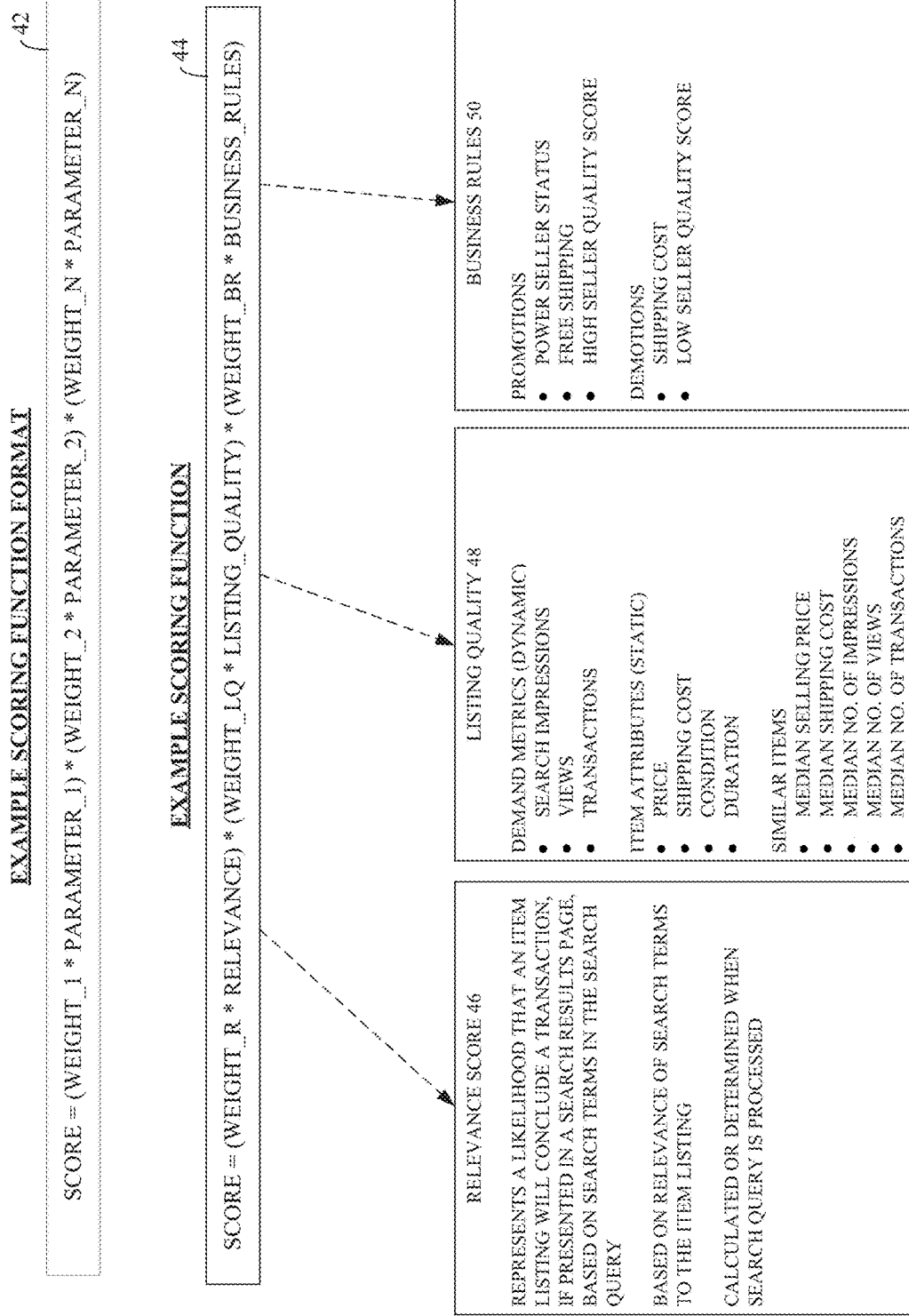
FIG. 2 illustrates an example of the general format of a scoring function for use in assigning a ranking score to an item listing that satisfies a search query processed with a computer-based on-line trading application, according to an embodiment of the invention.

FIG. 2 illustrates an example of the general format of a scoring function for use in assigning a ranking score, or listing performance score, to an item listing that satisfies a search query processed with a computer-based on-line trading application, according to an embodiment of the invention. As illustrated in FIG. 2, the example format for a scoring function is a formula or equation having any number of weighted parameters. In one particular embodiment, an example scoring function 44 may involve a weighted relevance score or parameter 46, a weighted listing quality score or parameter 48, and a weighted business rules score or parameter 50. The example scoring function 44 of FIG. 2 may be consistent with the description of the formula for deriving what is referred to as a best match score in related U.S. patent application Ser. No. 12/476,046, filed on Jun. 1, 2009, entitled, "METHODS AND SYSTEMS FOR DERIVING A SCORE WITH WHICH ITEM LISTINGS ARE ORDERED WHEN PRESENTED IN SEARCH RESULTS", which is hereby incorporated herein by reference. It will be readily appreciated by those skilled in the art that the example scoring function of FIG. 2 is but one of many scoring functions, which may have any number and type of parameters for use in assigning a ranking score to an item listing for use in ordering the item listings when presenting them in search results.

Figure 3:
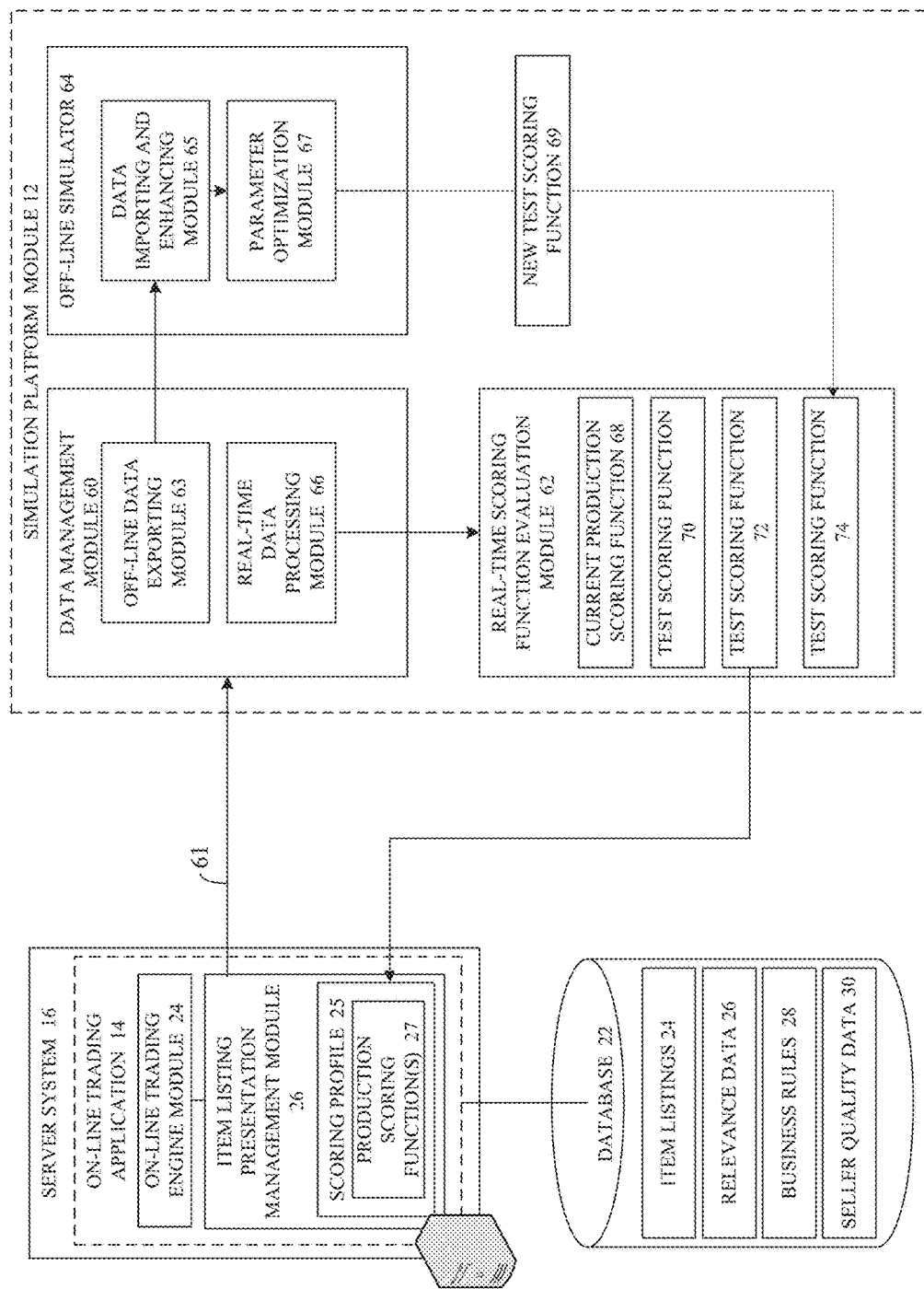
FIG. 3 is a block diagram showing an example of the various functional components or modules that comprise a simulation platform, according to an embodiment of the invention.

FIG. 3 is a block diagram showing an example of the various functional components or modules that comprise a simulation platform 12 for use with an on-line trading or e-commerce application, according to an embodiment of the invention. As illustrated in FIG. 3, the simulation platform 12 includes a data management module 60, a real-time scoring function evaluation module 62 and an off-line simulator module 64. In some embodiments of the invention, when an end-user specifies one or more keywords for a search, or selects various desired item attributes, a search query is executed by a search engine (not shown) of the item listing presentation management module 26. The item listing presentation management module 26 first identifies the item listings that satisfy the search query. Such item listings are referred to herein as the search result set. Once the search result set is identified, the production scoring function 27 is used to assign to each item listing in the search result set a listing performance score, or ranking score. Finally, a search results page is generated showing the item listings that satisfy the search query in an order that is based on their assigned listing performance score generated using the production scoring function 27.

As indicated by the arrow with reference number 61, when a particular item listing in the search results pages is selected and ultimately results in the conclusion of a transaction, the search result set is passed to the simulation platform module 12. In particular the data forwarded to the simulation platform module 12 may include the search query, the search result set (e.g., the item listings that satisfy the search query), and the position of the item listing that resulted in the conclusion of the transaction. In some instances, other activity data may be communicated to the simulation platform. For example, a view item event occurs when a user selects a particular item listing to view, but does not finalize a transaction. In some instances this information may also be passed to the simulation platform. When the query data is received at the data management module 60 of the simulation platform module 12, the real time data processing module 66 processes the data by retrieving any relevant data from database 22 that may be used as input data to the one or more test scoring functions being evaluated at the simulation platform module 12.

The real-time scoring function evaluation module 62 processes the received data with the current production scoring function 68 and one or more test scoring functions, such as the test scoring functions illustrated in FIG. 3 with reference numbers 70, 72 and 74. The evaluation module 62 calculates a rank shift for each test scoring function. The rank shift is a metric by which this test scoring function can be compared to the current production scoring function 68. For example, the position of the item listing that resulted in the conclusion of a transaction as determined by the current production scoring function 68 is taken as the baseline. Accordingly, the position of the particular item listing that resulted in the conclusion of a transaction as determined by one or more of the test scoring functions can be compared with the position of the same item listing determined by the current production scoring function 68. Assuming one of the test scoring functions results in positioning the particular item listing that resulted in the conclusion of a transaction in a more prominent listing slot (e.g., a lower numbered listing slot, based on a higher listing performance score), then that test scoring function would have outperformed the production scoring function for the particular query. By evaluating one or more test scoring functions over a large number of queries an average rank shift metric for each test scoring function can be derived. The average rank shift metric represents the average number of positions that a converting item listing is shifted from its baseline position (determined with the production scoring function) as a result of processing the queries with the test scoring function. A further example is presented in connection with the description of FIGS. 4 and 5.

In addition to the scoring function evaluation module 62, the simulation platform includes an off-line simulator for generating new test scoring functions. Specifically, a data importing and enhancing module 65 of the off-line simulator 64 requests data from the off-line data exporting module 63 of the data management module 60, and imports data representing sets of search results and corresponding converting item listings. The imported data is then processed with a parameter optimization module 67 to generate a new test scoring function 69. The parameter optimization module 67 processes sets of search results in accordance with one or more defined constraints, to derive weighting factors for parameters of a new scoring function that meet the defined constraints. For instance, in some cases, the constraints may be defined to derive the weighting factors for use in weighting certain parameters of a new scoring function, such that the new scoring function has the highest average rank shift metric compared to the baseline represented by the production scoring function. Once the weighting factors are derived, the new test scoring function can be evaluated with real-time data against other test scoring functions and the production scoring function.

Figure 4:
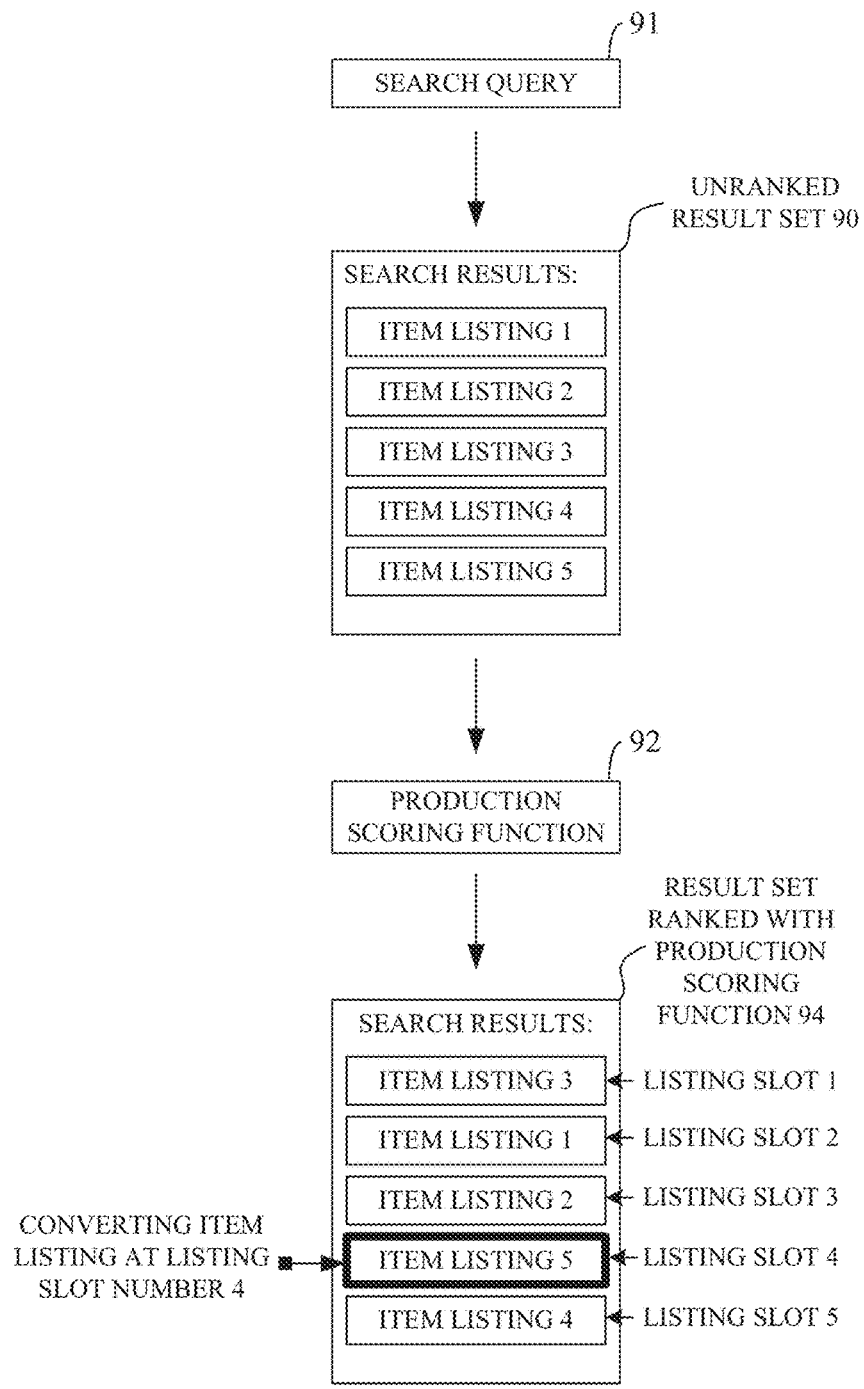
FIG. 4 is a block diagram showing an example of a set of search results (e.g., item listings) that satisfy a search query, both before and after the search result set has been processed with a production scoring function, according to an embodiment of the invention.

FIG. 4 is a block diagram showing an example of a set of search results 90 (e.g., item listings) that satisfy a search query 91, both before and after the search result set has been processed with a production scoring function, according to an embodiment of the invention. As illustrated in FIG. 4, an end-user's search query 91 is processed to generate an unranked result set 90. For example, the unranked result set 90 includes the set of item listings that satisfy the search query 91 shown in no particular order. After the item listings that satisfy the search query have been identified, a production scoring function 92 is utilized to assign to each item listing in the unranked result set a listing performance score. Based on the listing performance score assigned to each item listing, the item listings are ordered for presentation in the search results page. For example, in FIG. 4, the ranked search result set is shown with reference number 94. For instance, item listing three is shown to be positioned in listing slot one, representing the top position in the search results list.

As indicated in FIG. 4, item listing 5 in listing slot number four is selected by an end-user and ultimately results in the conclusion of a transaction. For instance, in this example, the user has selected item listing five and has purchased the item associated with item listing five. As such, item listing five, which is in listing slot number four, is referred to as a converting item listing. When this occurs, the search query 91, the ordered search result set 94 and the position, and corresponding listing performance score, for the converting item listing (e.g., item listing five in the example) are communicated to the simulation platform, thereby enabling the real-time evaluation of one or more test scoring functions.

Figure 5:
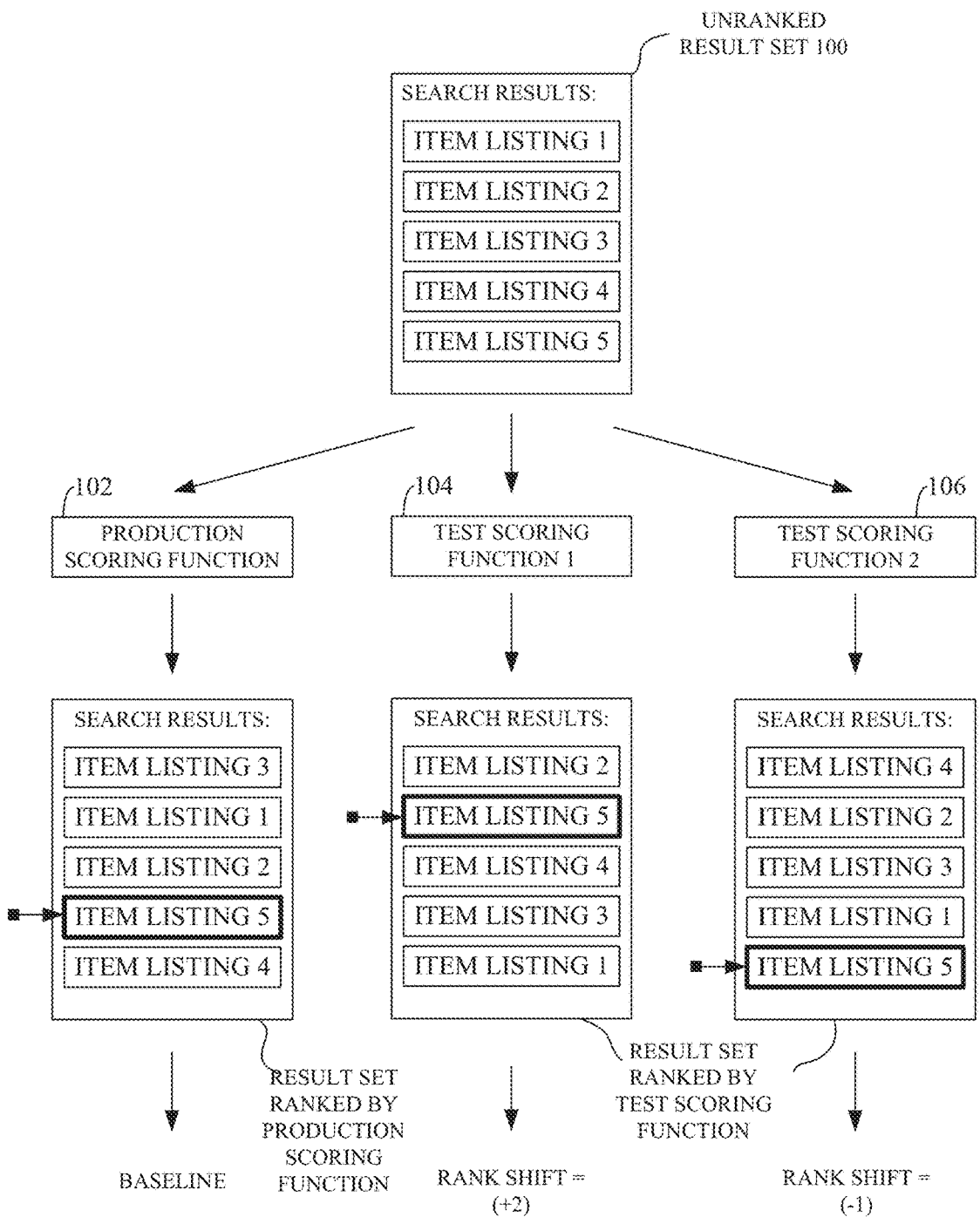
FIG. 5 is a block diagram showing an example of a set of search results (e.g., item listings) that satisfy a search query, both before and after the search result set has been processed with one of three scoring functions, according to an embodiment of the invention.

FIG. 5 is a block diagram showing an example of a set of search results (e.g., item listings) that satisfy a search query, both before and after the search result set has been processed with one of three scoring functions by a simulation platform, according to an embodiment of the invention. As illustrated in FIG. 5, the unranked result set 100 is processed at the simulation platform module using the production scoring function 102 as well as two test scoring functions 104 and 106. The various search results show how the individual scoring functions (e.g., 102, 104 and 106) order the item listings. For example, the production scoring function 102 generates the exact same result that was realized by the production scoring function in use by the online trading application (as illustrated in FIG. 4). Specifically, item listing five, which is the item listing that resulted in the conclusion of a transaction, appears in listing slot number four. As such, the production scoring function 102 is taken as a baseline to which the test scoring functions can be compared. More specifically, for this particular search query and result set, the baseline listing slot is listing slot number four, which is the position of the item listing in the actual search results page that resulted in a transaction being concluded.

When the item listings are ordered with test scoring function one, with reference number 104, item listing five is positioned in listing slot number two—an improvement over the baseline position. As such, for this example search query, the rank shift metric for test scoring function one is a positive two, reflecting the fact that item listing five has moved from listing slot number four to listing slot number two when the item listings were processed with test scoring function number one (e.g., reference number 104). As item listing five represents the item listing selected by the end-user, its placement in listing slot number two represents an improvement, as listing slot number two is deemed to be a more prominent position than listing slot number four. As such, for this particular query, test scoring function number one has outperformed the production scoring function.

As illustrated in FIG. 5, when the item listings are processed with test scoring function number two, with reference number 106, item listing five is positioned in listing slot number five. Accordingly, for test scoring function number two, the rank shift metric for this particular query is negative one, reflecting the change of the position of item listing five. In this particular example, for this particular query, the production scoring function 102 has outperformed test scoring function two, with reference number 106.

While FIG. 5 illustrates an example of processing a single query and associated search result set, it will be appreciated that the described process is repeated for a predetermined number of search queries to establish an average rank shift metric for each test scoring function that is being tested. For instance, FIG. 6 is a table showing how an average rank shift metric is derived for a predetermined number of queries, for one or more test functions, according to an embodiment of the invention. As illustrated in the table of FIG. 6, the simulation and evaluation of the test scoring functions is repeated for a predetermined number of queries. Accordingly, for each test scoring function and for each query a rank shift is observed. After enough queries have been processed, an average rank shift for each test scoring function can be computed. As illustrated in FIG. 6, the average rank shift for test scoring function one, for the "N" queries, is a positive 1.2, reflecting a slight improvement over the baseline of the production scoring function. Similarly, test scoring function number two has exhibited an average rank shift of negative 2.3, reflecting a slightly poorer performance than the baseline of the production scoring function. Finally, test scoring function N has exhibited a −1.1 average rank shift, representing a slightly poorer performance than the production scoring function.

It will be appreciated by those skilled in the art, that the average rank shift can be used to evaluate the various test scoring functions and determine the test scoring function that positions the converting item listings in the most prominent listing slots. As such, if a test scoring function exhibits a positive average rank shift over a statistically significant sample of search queries, the test scoring function may be put into the production system, replacing the production scoring function that it outperforms.

Figure 7:
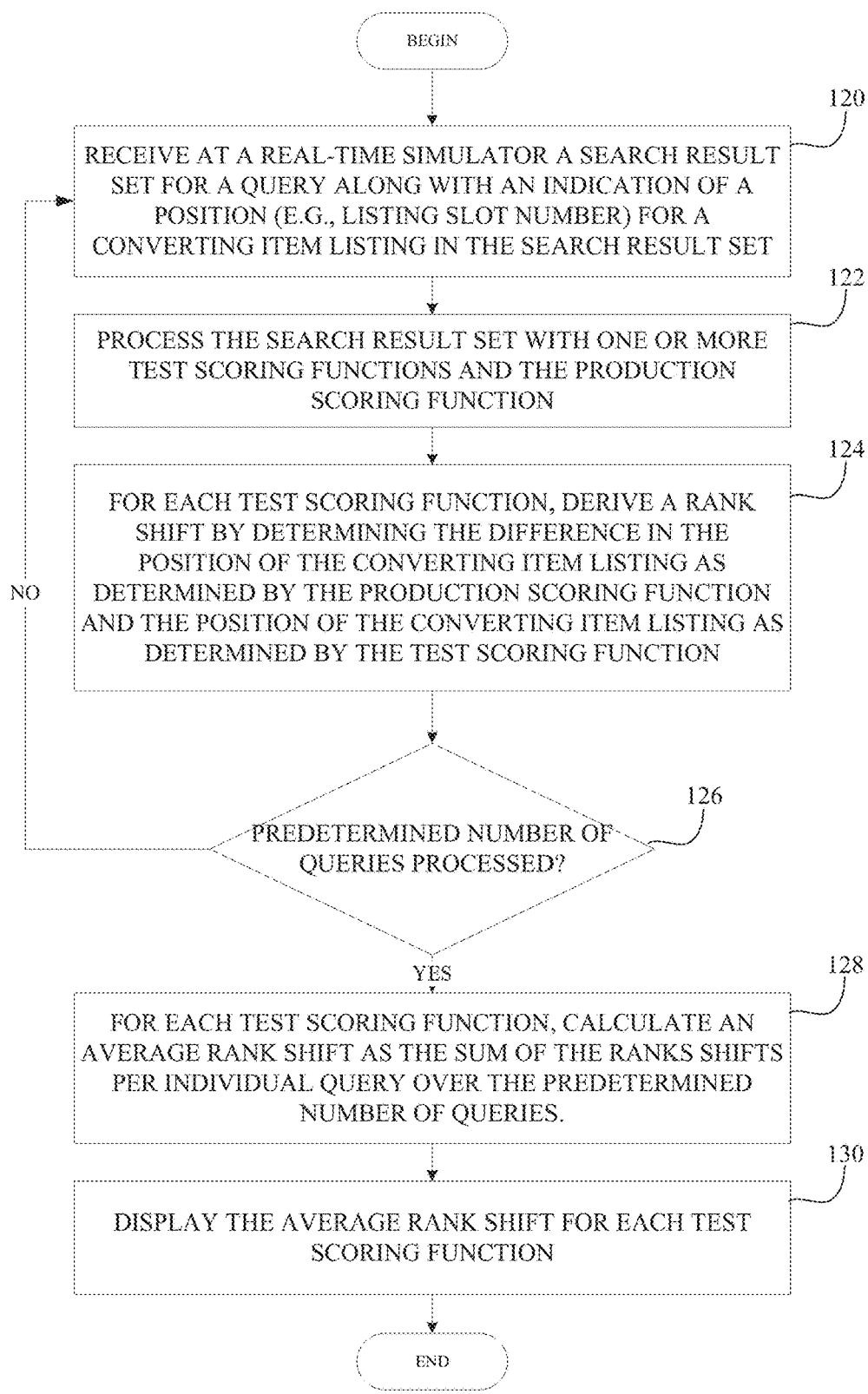
FIG. 7 is a flow diagram illustrating the method operations involved in a method for evaluating one or more test scoring functions for use in ordering item listings to be presented in search results, according to an embodiment of the invention.

FIG. 7 is a flow diagram illustrating the method operations involved in a method for evaluating one or more test scoring functions for use in ordering item listings to be presented in search results, according to an embodiment of the invention. The method begins at operation 120 when the real-time simulator (e.g., simulation platform 12 in FIG. 3) receives a search result set for a search query, along with an indication of a position (e.g., a listing slot number) for an item listing that has resulted in the conclusion of a transaction. For example, if a user performs a search with the keyword, "iPod 8 GB," and then selects the item listing in listing slot number five, and concludes a transaction, the item listing for listing slot number five is the converting item listing.

At method operation 122, the simulation platform module 12 processes the search result set with one or more test scoring functions and the current production scoring function. In some embodiments, the simulation operation is not performed with the production scoring function because the position of each converting item listing is already known and passed to the simulation module. However, in other embodiments, the production scoring functions are used to process the search result set at the simulation platform to establish the baseline. In any case, the item listings are ordered using each of the scoring functions. At method operation 124, for each test scoring function, a rink shift is derived by determining the difference in the position of the converting item listing as determined by the production scoring function and the position of the converting item listing as determined by a test scoring function. For example, if the converting item listing appeared in listing slot number three with the test scoring function, and listing slot number five with the production scoring function, the rank shift would be positive 2 (+2), reflecting the change from listing slot five to listing slot three.

At method operation 126, the simulation module determines whether a predetermined number of queries have been processed. For instance, the predetermined number of queries may be set to reflect some statistically significant sample size to ensure that any resulting average rank shift metric for a test scoring function is representative of the scoring function's actual performance. If the threshold number of queries has been reached, then at operation 128, for each test scoring function an average rank shift is calculated as the sum of the rank shifts for the individual queries over the predetermined number of queries. Finally at method operation 130, the average rank shift for each test scoring function is displayed. This allows an administrator, or business decision maker, to compare the average rank shift metrics for the various test scoring functions with the current production scoring function, and decide whether or not to replace the current production scoring function with one of the test scoring functions.

Figure 8:
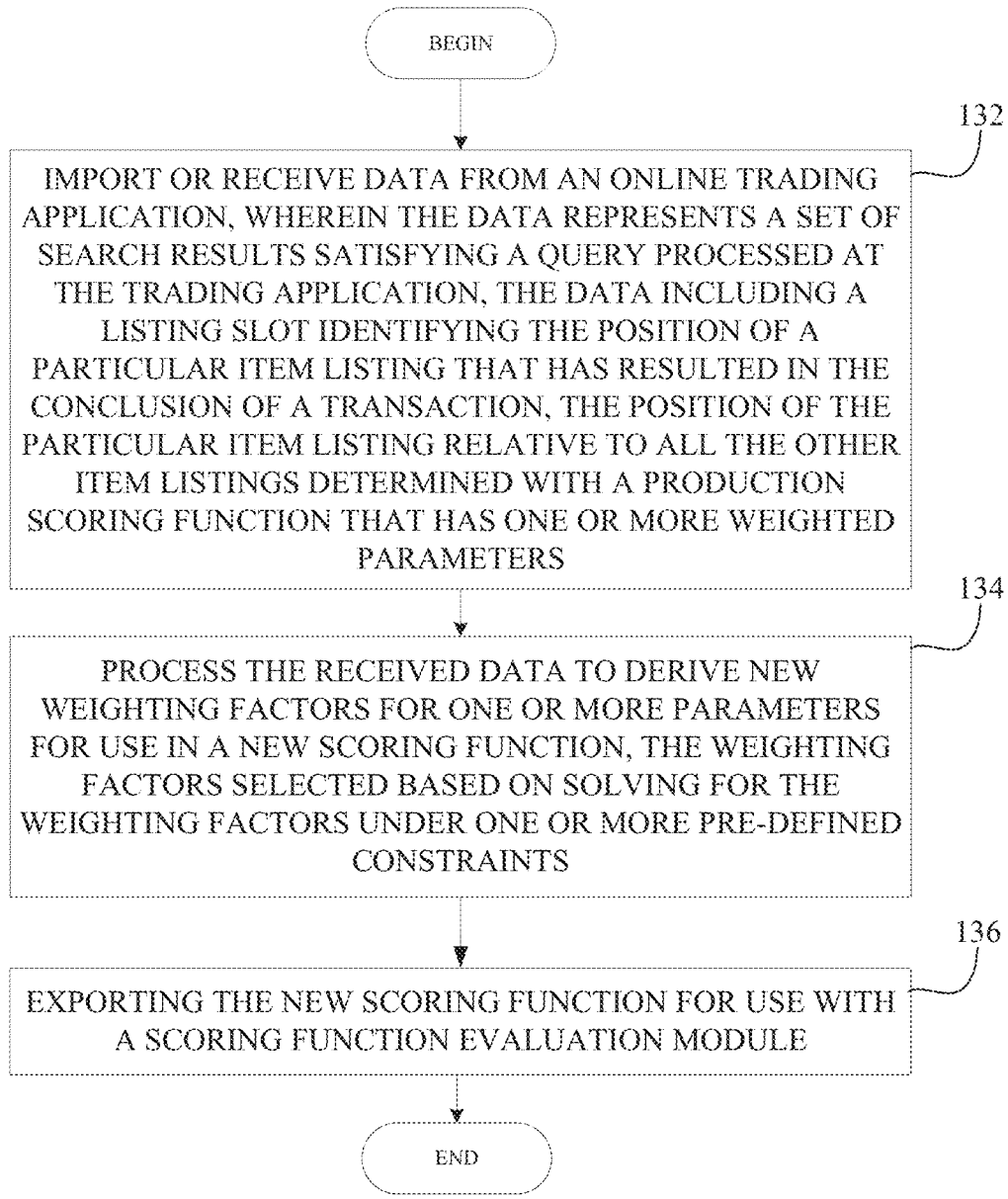
FIG. 8 is a flow diagram illustrating the method operations involved in a method for generating the weighting factors used with a new scoring function.

FIG. 8 is a flow diagram illustrating the method operations involved in a method for generating the weighting factors used with a new scoring function. As illustrated in FIG. 8, at method operation 132, an offline simulator module receives or imports several sets of search results with corresponding converting item listings. For instance, because the offline simulator does not operate in real-time, large quantities of data (e.g., search result set) can be imported and processed. In contrast to the real-time simulator, which evaluates the various scoring functions by comparing the performance of the test scoring functions to the production scoring function or functions, the offline simulator is designed to derive one or more sets of weighting factors for use in weighting the parameters of a particular scoring function.

Accordingly, at method operation 134, the imported or received sets of search results are processed in accordance with one or more pre-defined constraints to derive an optimized set of weighting factors for the specified parameters of a new scoring function. For instance, the constraint may be defined to derive the weighting factors that provide the greatest average rank shift metric for a particular set of search results, for a particular set of parameters. In this manner, new test scoring functions can be generated to achieve certain business objectives that correspond with the defined constraints. At method operation 136, the new scoring function is exported to a real-time simulator (e.g., the scoring function evaluation model 62 in FIG. 3) so that the new scoring function can be tested in real-time, with real-time production data, against the production scoring function.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 9:
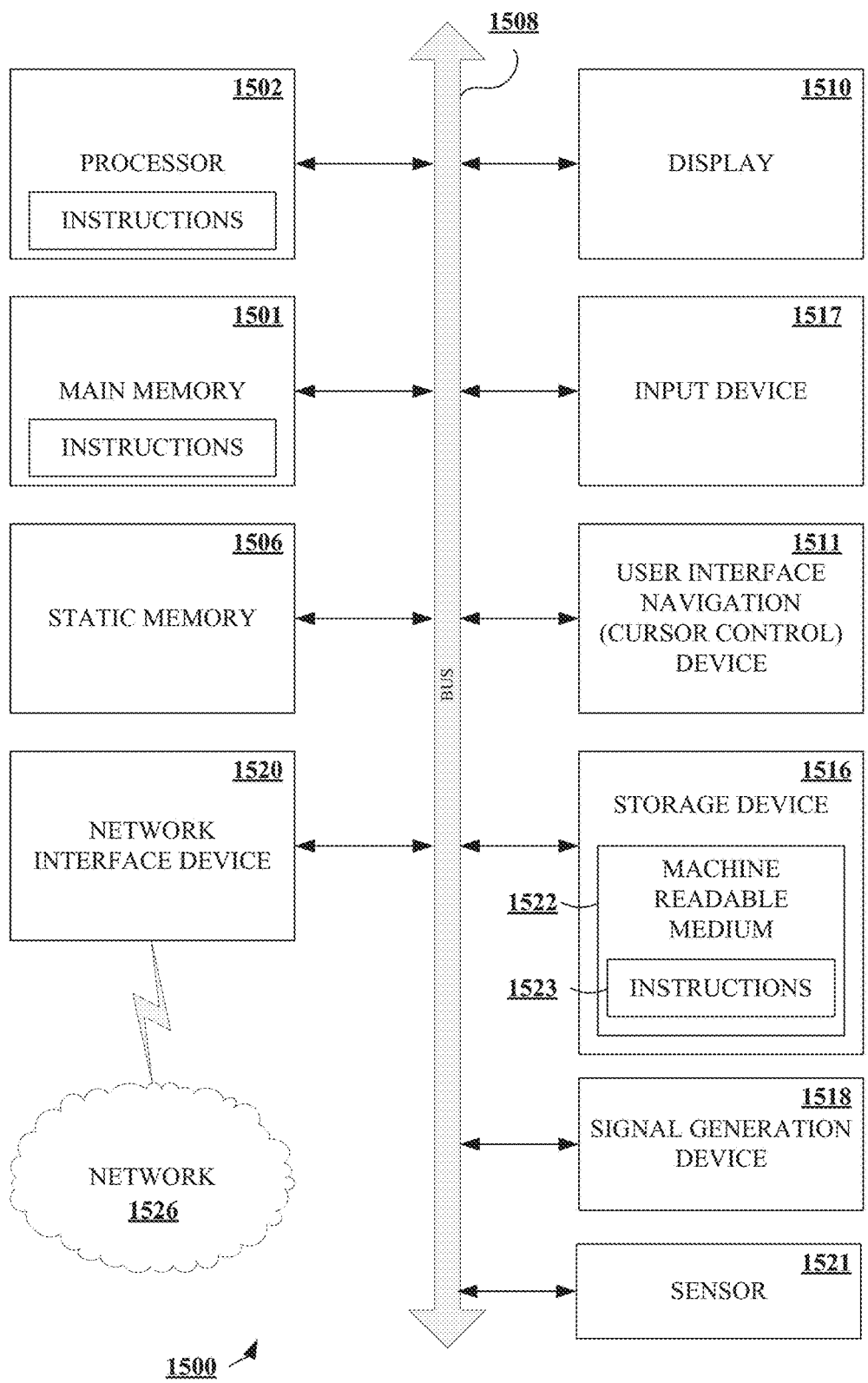
FIG. 9 is a block diagram of a machine in the form of a computer system within which a set of instructions, for causing the machine to perform any one or more of the methodologies discussed herein, may be executed.

FIG. 9 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   detecting end-user activities corresponding to a first set of item listings;
   generating event data corresponding to the end-user activities that indicate a conversion activity was detected for a particular item of the first set of item listings;
   receiving, from a listing data structure, the first set of item listings and a slot listing number stored in the event data, the first set of item listings being identified based on a search query, the slot listing number identifying a position of the particular item listing in a presentation of the first set of item listings as a first search results page by a first processor-implemented scoring function that positions each item listing in the first search results page in a defined order;
   identifying a numeric rank shift representing a number of positions that the particular item shifted in a search results page as a result of processing the first set of item listings with a second processor-implemented scoring function;
   based on a comparison of an average rank shift for the second processor-implemented scoring function, determining a performance of the second processor-implemented scoring function compared to the first processor-implemented scoring function for the first set of item listings, the average rank shift being the average of each numeric rank shift for a sample of queries, the sample of queries comprising a predetermined number of queries ensuring the average rank shift is representative of the performance for the second processor-implemented scoring function; and
   upon determining the performance of the second-implemented scoring function exceeds the performance of the first processor-implemented scoring function, replacing the first processor-implemented scoring function with the second processor-implemented scoring function.

2. The computer-implemented method of claim 1, wherein the receiving of the first set of item listings and the identifying occur in substantially real time using input data for the second processor-implemented scoring function that is equivalent to the input data used by the first processor-implemented scoring function.

3. The computer-implemented method of claim 1, wherein the receiving the first set of item listings includes receiving item attribute data associated with each item listing for use as input data to the second processor-implemented scoring function.

4. The computer-implemented method of claim 1, wherein the identifying includes assigning to each item listing in the first set of item listings a listing slot number identifying the position for presenting the item listing in the second search results page.

5. The computer-implemented method of claim 1, wherein a positive average rank shift for the second processor-implemented scoring function indicates the second processor-implemented scoring function performed better than the first processor-implemented scoring function for sets of item listings processed with the second processor-implemented scoring function.

6. The computer-implemented method of claim 1, wherein a negative average rank shift for the second processor-implemented scoring function indicates the second processor-implemented scoring function performed worse than the first processor-implemented scoring function for sets of item listings processed with the second processor-implemented scoring function.

7. The computer-implemented method of claim 1, wherein the particular item listing that has resulted in the conversion of the item is an item listing that has been displayed as a result of having been selected from the first set of item listings presented in the first search results page.

8. The computer-implemented method of claim 1, wherein the first processor-implemented scoring function and the second processor-implemented scoring function are implemented as equations involving a product of one or more weighted parameters.

9. The computer-implemented method of claim 8, wherein the one or more weighted parameters are selected from the group consisting of: specified price of item, shipping cost, search impression count of an item listing, number of item views for an item listing, number of previous transactions concluded for an item listing, median selling price of item listings determined to be similar to an item listing, and median shipping cost of item listings determined to be similar to an item listing.

10. A data processing system comprising:
at least one processor; and
a machine-readable medium in communication with the at least one processor, the machine readable medium storing a simulation platform module that is executable by the at least one processor, the simulation platform module being executed by the at least one processor to cause operations to be performed, the operations comprising:
detecting end-user activities corresponding to a first set of item listings;
generating event data corresponding to the end-user activities that indicate a conversion activity was detected for a particular item of the first set of item listings;
receiving, from a listing data structure, the first set of item listings and a slot listing number stored in the event data, the first set of item listings being identified based on a search query, the slot listing number identifying a position of the particular item listing in a presentation of the first set of item listings as a first search results page by a first processor-implemented scoring function that positions each item listing in the first search results page in a defined order;
identifying a numeric rank shift representing a number of positions that the particular item shifted in a search results page as a result of processing the first set of item listings with a second processor-implemented scoring function;
based on a comparison of an average rank shift for the second processor-implemented scoring function, determining a performance of the second processor-implemented scoring function compared to the first processor-implemented scoring function for the first set of item listings, the average rank shift being the average of each numeric rank shift for a sample of queries, the sample of queries comprising a predetermined number of queries ensuring the average rank shift is representative of the performance for the second processor-implemented scoring function; and
upon determining the performance of the second-implemented scoring function exceeds the performance of the first processor-implemented scoring function, replacing the first processor-implemented scoring function with the second processor-implemented scoring function.

11. The data processing system of claim 10, wherein the receiving of the first set of item listings and the identifying occur in substantially real time using input data for the second processor-implemented scoring function that is equivalent to the input data used by the first processor-implemented scoring function.

12. The data processing system of claim 10, wherein the receiving the first set of item listings includes receiving item attribute data associated with each item listing for use as input data to the second processor-implemented scoring function.

13. The data processing system of claim 10, wherein the identifying includes assigning to each item listing in the first set of item listings a listing slot number identifying the position for presenting the item listing in the second search results page.

14. The data processing system of claim 10, wherein a positive average rank shift for the second processor-implemented scoring function indicates the second processor-implemented scoring function performed better than the first processor-implemented scoring function for sets of item listings processed with the second processor-implemented scoring function.

15. The data processing system of claim 10, wherein a negative average rank shift for the second processor-implemented scoring function indicates the second processor-implemented scoring function performed worse than the first processor-implemented scoring function for sets of item listings processed with the second processor-implemented scoring function.

16. The data processing system of claim 10, wherein the particular item listing that has resulted in the conversion of the item is an item listing that has been displayed as a result of having been selected from the first set of item listings presented in the first search results page.

17. The data processing system of claim 10, wherein the first processor-implemented scoring function and the second processor-implemented scoring function are implemented as equations involving a product of one or more weighted parameters.

18. A non-transitory machine-readable storage medium storing instructions which, when executed by at least one processor of a machine, cause the machine to perform operations comprising:
detecting end-user activities corresponding to a first set of item listings;
generating event data corresponding to the end-user activities that indicate a conversion activity was detected for a particular item of the first set of item listings;

receiving, from a listing data structure, the first set of item listings and a slot listing number stored in the event data, the first set of item listings being identified based on a search query, the slot listing number identifying a position of the particular item listing in a presentation of the first set of item listings as a first search results page by a first processor-implemented scoring function that positions each item listing in the first search results page in a defined order;

identifying a numeric rank shift representing a number of positions that the particular item shifted in a search results page as a result of processing the first set of item listings with a second processor-implemented scoring function;

based on a comparison of an average rank shift for the second processor-implemented scoring function, determining a performance of the second processor-implemented scoring function compared to the first processor-implemented scoring function for the first set of item listings, the average rank shift being the average of each numeric rank shift for a sample of queries, the sample of queries comprising a predetermined number of queries ensuring the average rank shift is representative of the performance for the second processor-implemented scoring function; and upon determining the performance of the second-implemented scoring function exceeds the performance of the first processor-implemented scoring function, replacing the first processor-implemented scoring function with the second processor-implemented scoring function.

19. The non-transitory machine-readable storage medium of claim 18, wherein the receiving of the first set of item listings and the identifying occur in substantially real time using input data for the second processor-implemented scoring function that is equivalent to the input data used by the first processor-implemented scoring function.

20. The non-transitory machine-readable storage medium of claim 18, wherein the first processor-implemented scoring function and the second processor-implemented scoring function are implemented as equations involving a product of one or more weighted parameters.

* * * * *